US012285768B2

(12) United States Patent
Emilsson et al.

(10) Patent No.: US 12,285,768 B2
(45) Date of Patent: Apr. 29, 2025

(54) CANISTER

(71) Applicant: Valmet Technologies Oy, Espoo (FI)

(72) Inventors: Johan Emilsson, Stockholm (SE); Sanjay Yallure, Pune (IN)

(73) Assignee: Valmet Technologies Oy, Espoo (FI)

( * ) Notice: Subject to any disclaimer, the term of this patent is extended or adjusted under 35 U.S.C. 154(b) by 486 days.

(21) Appl. No.: 17/890,118

(22) Filed: Aug. 17, 2022

(65) Prior Publication Data

US 2023/0065169 A1 Mar. 2, 2023

(30) Foreign Application Priority Data

Aug. 27, 2021 (FI) .................................... 20215902

(51) Int. Cl.
*B04C 9/00* (2006.01)

(52) U.S. Cl.
CPC .................................... *B04C 9/00* (2013.01)

(58) Field of Classification Search
None
See application file for complete search history.

(56) References Cited

FOREIGN PATENT DOCUMENTS

| | | | |
|---|---|---|---|
| CN | 212702479 | U | 3/2021 |
| JP | 2009189985 | B2 | 8/2009 |
| WO | 9107231 | A1 | 5/1991 |

*Primary Examiner* — Krishnan S Menon
(74) *Attorney, Agent, or Firm* — James Earl Lowe, Jr.

(57) ABSTRACT

A canister which has a substantially cylindrical form and comprises an innermost compartment located around an imaginary center axis of the cylindrical form and extending longitudinally in axial direction of the canister. The canister comprises cleaner cones, which have a substantially cone-like form with a hollow inside and which cleaner cones are removably mounted to the canister and located in the canister such, that narrow ends of cone form of the cleaner cones extend to the innermost compartment and wide ends of the cone form of the cleaner cones extend to the cylindrical circumference of the canister. The cleaner cones comprise covers and the cleaner cones are mounted such that cover of the cleaner cone is outside the canister. The canister further comprises an inspection light source configured to provide a visible indication of status of a cleaner cone of the canister in view of possible plug in the cleaner cone, when the light source is in operation.

9 Claims, 3 Drawing Sheets

CANISTER

TECHNICAL FIELD

The invention relates to a canister according to the features of the preamble part of the independent canister claim.

BACKGROUND

As known from prior art different types of hydrocyclone cleaners are used in various applications for separating and classifying the contents of a slurry into an accept stream and into a reject stream such that the accept stream may be eventually utilized in a particular process and the reject stream is either further processed to recover acceptable material or disposed of. Such applications include food processing, chemical processing, metal working, mining and drilling, sewage and waste treatment, water pollution control, and pulp and papermaking. In the hydrocyclone cleaners cleaner cones may be disposed vertically, horizontally or radially. The present invention relates to hydrocyclone cleaners of the canister-type, referred in this description and the claims as a canister. The canisters comprise cleaner cones used in pulp industry for example for separating or fractionating fibrous suspensions. The canisters with the cleaner cones are well-known in the art. In the canisters several cleaner cones are mounted individually in a canister structure, which provides common inlets and common outlets for the individual cleaner cones, the cleaner cones being by sealed mounting locate through openings in walls of the canister. The cleaner cones are located circumferentially around the innermost compartment of the canister on several on top of each other in axial direction of the canister at a distance located levels. As explained the canisters comprise a large number of cleaner cones, typically hundreds of cleaner cones are installed in one canister. Over a period, some cleaner cones might get plugged. Based on the flow parameters of the canister, it is possible to predict and calculate number of cleaner cones plugged, however this reveals not which ones of the cleaner cones are plugged. When large number of cleaner cones are plugged, process of cleaning is no more efficient or may even stop and thus, need of cleaning the plugged cleaner cones arises. Since typically not all of the cleaner cones are plugged, there is a need to identify, which ones of the cleaner cones are plugged and need to be cleared out. Presently this is done by first inspecting each one of the cleaner cones manually to identify the plugged ones and there after clearing out the plug of the cleaner cone, which is a cumbersome and hard work as a canister can contain up to 600 cleaners and due to the design of the cleaner cones, a plugged cleaner cone is very difficult to detect. Thus, the canisters, especially the cleaner cones thereof, require periodic inspection, and also cleaning may be needed especially in case any of the cleaner cones have plugged. During this inspection and maintenance work, each of the cleaner must be detached and pulled from the canister, inspected and cleaned, if needed, and then reinserted. This maintenance work is done while the canister is not operating, thus the long time needed also causes the more production losses the more time this maintenance work takes.

An object of the present invention is to create a canister, in which the above explained problems are solved or at least minimized.

In particular, an object of the present invention is to provide a canister in which the problems relating to detecting of the plugged cleaner cones of the canister are solved or at least minimized.

In particular, an object of the present invention is to provide a canister, which eliminates or at least minimizes the need of stopping the process for the inspection of the cleaner cones to identify the plugged cleaner cones.

SUMMARY

In order to achieve the above mentioned and those later presented the canister according to the invention is mainly characterized by the features of the characterizing part of the canister claim. Further advantageous embodiments and features of the invention are disclosed in the dependent claims.

According to the invention the canister has a substantially cylindrical form and comprises an innermost compartment located around an imaginary center axis of the cylindrical form and extending longitudinally in axial direction of the canister and comprises cleaner cones, which have a substantially cone-like form with a hollow inside and which cleaner cones are removably mounted to the canister and located in the canister such, that narrow ends of cone form of the cleaner cones extend to the innermost compartment and wide ends of the cone form of the cleaner cones extend to the cylindrical circumference of the canister, in which the cleaner cones comprise covers and the cleaner cones are mounted such that cover of the cleaner cone is outside the canister, wherein the canister further comprises inspection means comprising a light source configured to provide a visible indication of status of a cleaner cone of the canister in view of possible plug in the cleaner cone, when the light source is in operation.

According to an advantageous feature the canister has a cylindrical outer wall and a bottom and a top and the innermost compartment extends longitudinally in axial direction of the canister between the bottom and the top.

According to an advantageous feature the innermost compartment comprises an upper port at the top of the canister.

According to an advantageous feature the light source is a mobile device with a lamp or like light equipment, which is configured to be used during a shut-down at an inspection stage to check whether the cleaner cones of the canister are plugged or not.

According to the invention the light source is configured to illuminate the innermost compartment for detecting a plug or like in any of the cleaner cones without removing the cleaner cone from the canister by looking whether light in the innermost compartment is visible through the cleaner cone and define the status of the cleaner cone in respect of possible plug in the cleaner cone.

According to an advantageous feature the covers of the cleaner cones are transparent and the light in the innermost compartment is visible through the transparent covers of the cleaner cone to define the status of the cleaner cone in respect of possible plug in the cleaner cone.

According to an advantageous feature the covers of the cleaner cones are non-transparent and the cover is configured to be removed from the cleaner cone to check whether the light in the innermost compartment is visible to define the status of the cleaner cone in respect of possible plug in the cleaner cone.

According to an advantageous feature the light source is located in an illuminating part configured to be located in a position of a cleaner cone in the canister.

According to an advantageous feature the light source is located at the upper port of the canister.

According to an advantageous feature the canister also comprises a switch to turn on and off the light source.

According to an advantageous feature the cleaner cone comprises an optical fiber embedded in the cleaner cone and extending from the wide end of the cleaner cone to the narrow end of the cleaner and back, at the wide end of the cleaner cone the optical fiber has an emitter end and a feedback end with a receiver, the optical fiber extends over the narrow end of the cleaner cone such, that it extend crosswise over the open end of the cleaner cone and the light source is a laser beam source providing a laser light pointed to the emitter end of the optical fiber at the wide end of the cleaner cone and is configured to provide a visible indication of status of a cleaner cone of the canister in view of possible plug in the cleaner cone such, that as the laser light passes from the emitter end to the receiver in the feedback end, in case the cleaner cone is not plugged and the feedback end will glow or in case the cleaner cone is plugged the laser light will not return to the receiver of the feedback end of the optical fiber and the feedback end will not glow.

According to the advantageous aspect of the invention the canister comprises a light source, which when turned on, illuminates the inside compartment of the canister and thus the light can be seen through the cleaner cones, when the cleaner cones are not plugged. The light source can be formed to a part configured to fit a position of a cleaner cone or it can be located at a port at upper part of the canister.

According to an advantageous aspect of the invention the canister comprises cleaner cones with a transparent cover and the canister further comprises at least one cleaner cone provided with a light source, which light source is advantageously located close to imaginary center axis of the canister. Thus, it will be possible to detect a plug or like in any of the cleaner cones without removing the cleaner cone from the canister by looking whether light from the light source is visible through the transparent cover. In case the cleaner cones are not provided with the transparent covers, the cover only needs to be removed to check, whether the light can be seen through the cleaner cone but the cleaner cone itself does not need to be removed for the inspection.

According to another advantageous aspect an optical fiber is embedded in the cleaner body. When the need to check if the cleaner is plugged, laser beam is pointed to one end of the optical fiber. If the cleaner is plugged, the laser light will not return at the other end of the optical fiber. If there is no plug then laser light will glow at the other end of the optical fiber.

By the canister according to the invention and its advantageous features many advantages are achieved: In this design of cleaners, whether it is installed on a canister or on a bank, we will be able to identify the blocked cleaners. There are other dynamic plugging detection solutions but none that work in this fashion as it relates to making inspection during shut-downs much easier. This is simple and unique.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

BRIEF DESCRIPTION OF THE DRAWINGS

Aspects of the invention, however, both as to its construction and its method of operation, together with additional objects and advantages thereof, will be best understood from the following description of some example embodiments when read in connection with the accompanying drawings and in the following the invention is described in more detail referring to the accompanying drawing, in which in FIGS. 1A-1B is schematically shown one advantageous example of a canister, in FIGS. 2A-2B is schematically shown another advantageous example of a canister and in FIGS. 3A-3D is schematically shown an advantageous example of a cleaner cone of a canister.

DETAILED DESCRIPTION

During the course of the following description like numbers and signs will be used to identify like elements according to the different views which illustrate the invention and its advantageous examples. In the figures some repetitive reference signs have been omitted for clarity reasons.

Figure 1B:
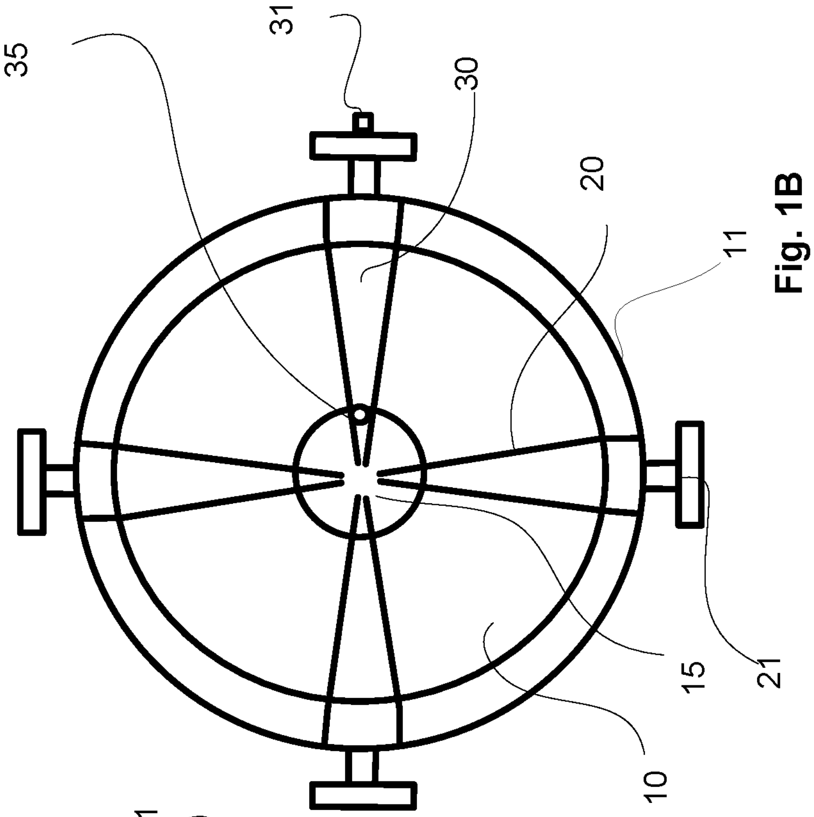
Figure 1A:
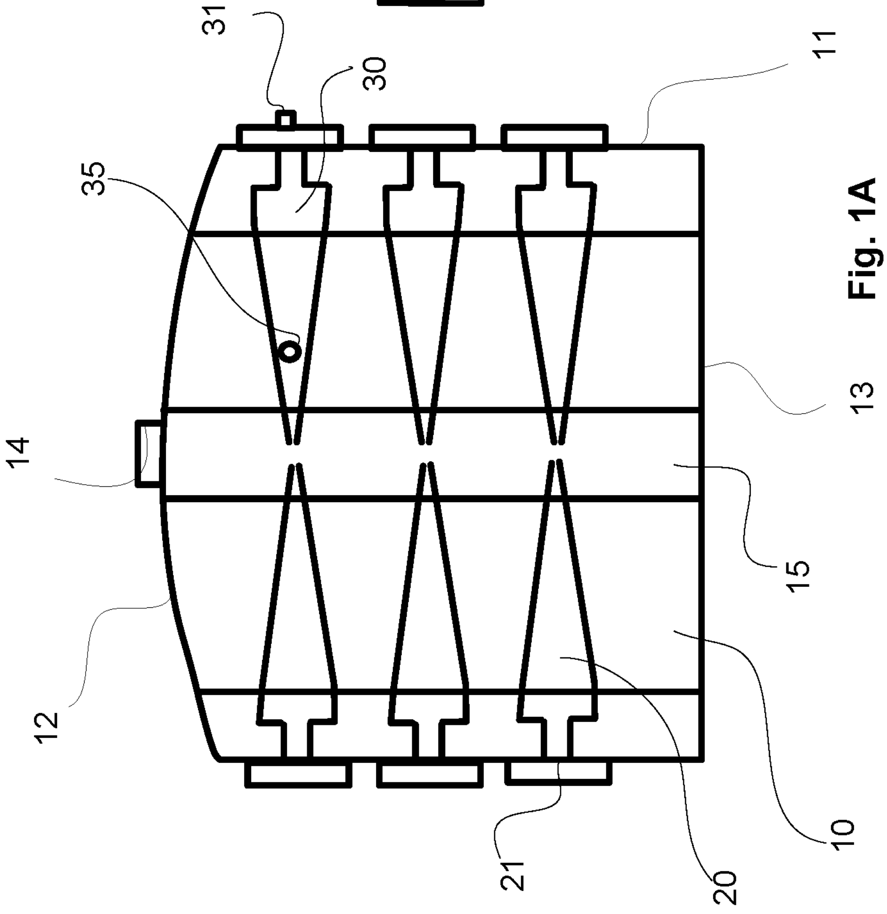

In the FIGS. 1A-1B is shown an example of a canister 10, which has a substantially cylindrical form. Thus, the canister 10 has a cylindrical outer wall 11 and a bottom 13 and a top 12. The canister 10 comprises an innermost compartment 15 located around an imaginary center axis of the cylindrical form and extending longitudinally between the bottom 13 and the top 12. At the top 12 the innermost compartment 15 has an upper port 14. The canister 10 comprises cleaner cones 20, which have a substantially cone-like form with a hollow inside and which are located inside the canister 10 such, that narrow ends of cone form of the cleaner cones 20 extend to the innermost compartment 15 and wide ends of the cone form of the cleaner cones 20 extend to outer wall 11 of the canister 10. The cleaner cones 20 are mounted such that cover 21 of the cleaner cone 20 is outside the canister 10. The covers 21 are removably attached to the cleaner cone 20. Advantageously, the covers 21 are transparent. The canister 10 comprises a light source 35, which when turned on, illuminates the inside compartment 15 of the canister 10 and thus the light can be seen through those cleaner cones 20, which are not plugged. The light source 35 is advantageously a mobile device with a lamp or like light emitting equipment, which is used during a shut-down at an inspection stage to check whether the cleaner cones 20 are plugged or not. The light source 35 can either be placed for example on top of the canister 10 or installed in a cleaner cone 30 designed to be used during the inspection stage. In this example the light source 35 is located in an illuminating part 30 configured to fit the position of a cleaner cone 20. The canister 10 also comprises a switch 31, located in the illuminating part 30, to turn on and off the light source 35. In this example the canister 10 comprises cleaner cones 20 with the transparent cover 21. The light source 35 is advantageously located close to imaginary center axis of the canister 10 and the innermost compartment 15. Thus, it will be possible to detect a plug or like in any of the cleaner cones 20 without removing the cleaner cone 20 from the canister 10 by looking whether light from the light source 35 is visible through the transparent cover 21. In case the cleaner cones 20 are not provided with the transparent covers 21, the cover 21 only needs to be removed to check, whether the light can be seen through the cleaner cone 20 but the cleaner cone 20 itself does not need to be removed for the inspection.

Figure 2B:
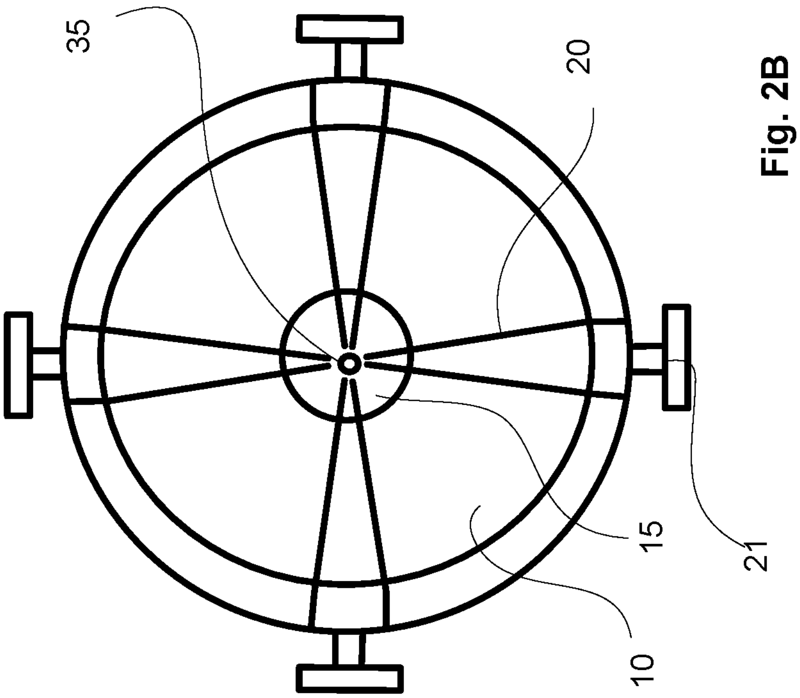
Figure 2A:
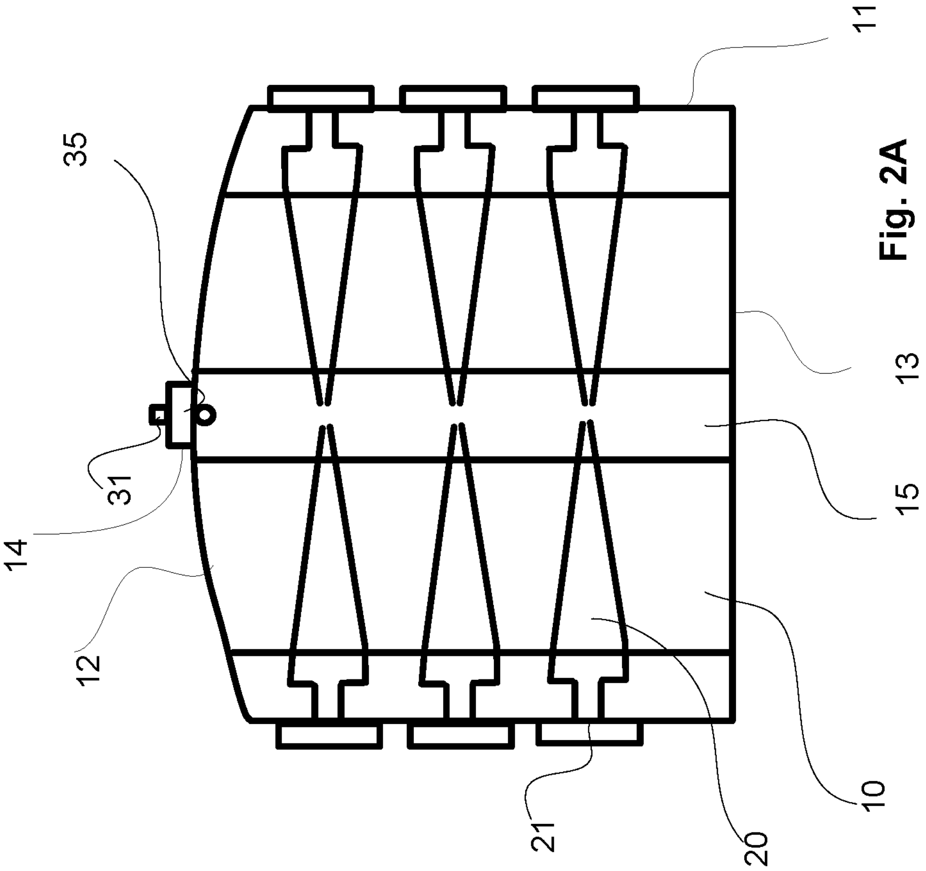
Figure 3A:
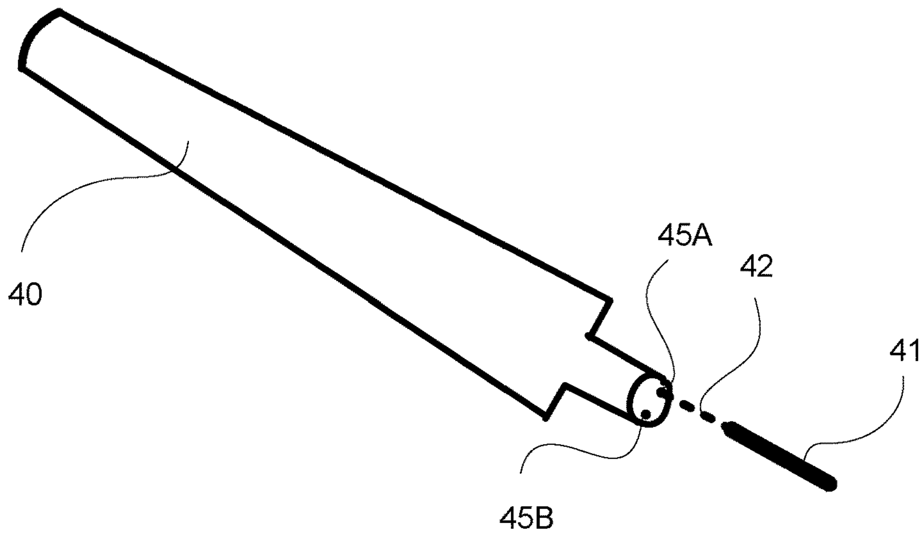
Figure 3B:
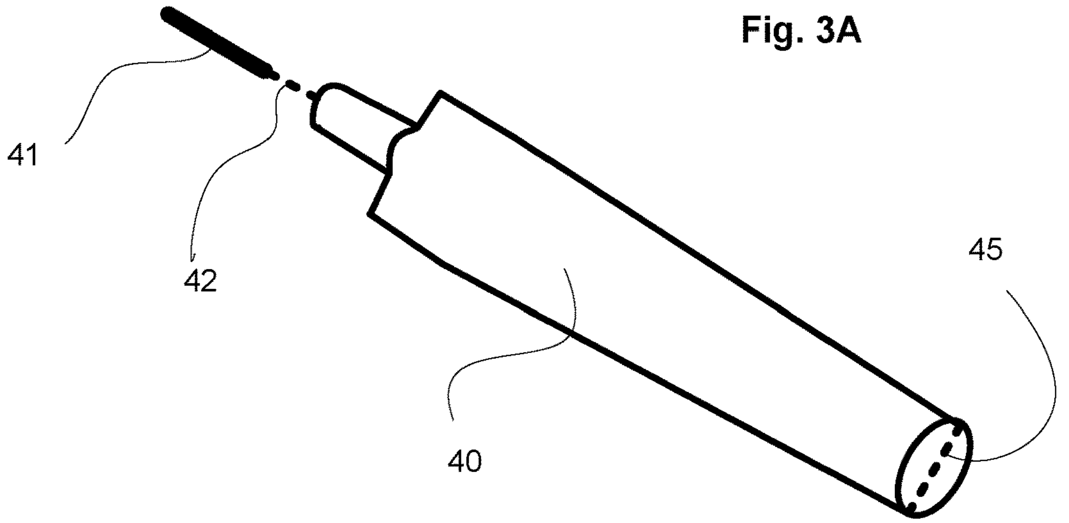
Figure 3C:
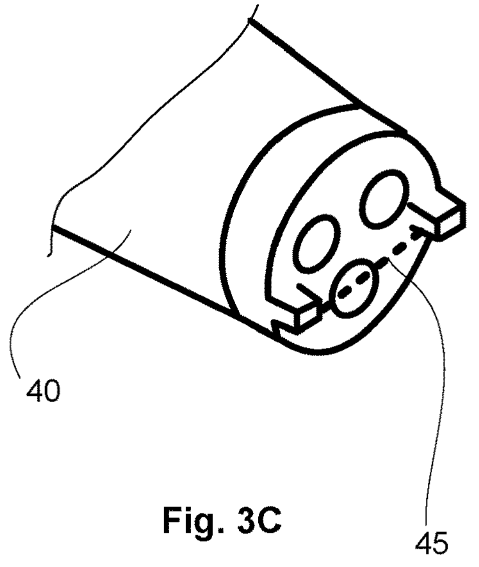
Figure 3D:
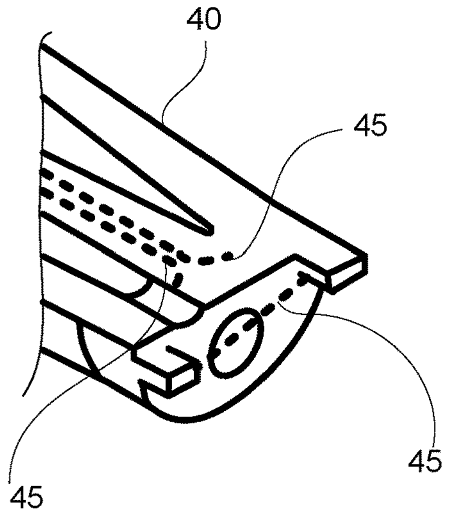

In the FIGS. 2A-2B shown example an example of a canister 10, which has a substantially cylindrical form. Thus, the canister 10 has a cylindrical outer wall 11 and a bottom 13 and a top 12. The canister 10 comprises an innermost compartment 15 located around an imaginary center axis of the cylindrical form and extending longitudinally between the bottom 13 and the top 12. At the top 12 the innermost compartment 15 has an upper port 14. The canister 10 comprises cleaner cones 20, which have a substantially cone-like form with a hollow inside and which are located inside the canister 10 such, that narrow ends of cone form of the cleaner cones 20 extend to the innermost compartment 15 and wide ends of the cone form of the cleaner cones 20 extend to outer wall 11 of the canister 10. The cleaner cones 20 are mounted such that cover 21 of the cleaner cone 20 is outside the canister 10. The covers 21 are removably attached to the cleaner cone 20. Advantageously, the covers 21 are transparent. The canister 10 comprises a light source 35, which when turned on, illuminates the inside compartment 15 of the canister 10 and thus the light can be seen through those cleaner cones 20, which are not plugged. The light source 35 is advantageously a mobile device with a lamp or like light emitting equipment, which is used during a shut-down at an inspection stage to check whether the cleaner cones 20 are plugged or not. The light source 35 can either be placed for example on top of the canister 10 or installed in a cleaner cone 30 designed to be used during the inspection stage. In this example the light source 35 is located at the upper port 14 at upper part of the canister 10. The canister 10 also comprises a switch 31 to turn on and off the light source 35. In this example the canister 10 comprises cleaner cones 20 with the transparent cover 21. The light source 35 is advantageously located close to imaginary center axis of the canister 10 and the innermost compartment 15. Thus, it will be possible to detect a plug or like in any of the cleaner cones 20 without removing the cleaner cone 20 from the canister 10 by looking whether light from the light source 35 is visible through the transparent cover 21. In case the cleaner cones 20 are not provided with the transparent covers 21, the cover 21 only needs to be removed to check, whether the light can be seen through the cleaner cone 20 but the cleaner cone 20 itself does not need to be removed for the inspection.

In FIGS. 3A-3D is shown example a cleaner cone 40 to be located in a canister 10, which has a substantially cylindrical for and thus, a cylindrical outer wall 11 and a bottom 13 and a top 12. The canister 10 also comprises an innermost compartment 15 located around an imaginary center axis of the cylindrical form and extending longitudinally between the bottom 13 and the top 12. The canister 10 comprises several cleaner cones 40, which have a substantially cone-like form with a hollow inside and which are located inside the canister 10 such, that narrow ends of cone form of the cleaner cones 40 extend to the innermost compartment 15 and wide ends of the cone form of the cleaner cones 40 extend to outer wall 11 of the canister 10. The cleaner cone 40 comprises an optical fiber 45 is embedded in the cleaner cone 40 extending from the wide end of the cleaner cone 40 to the narrow end of the cleaner 40 and back. At the wide end the optical fiber 45 has an emitter end 45A and a feedback end 45B with a receiver. The optical fiber 45 extends over the narrow end of the cleaner cone 40 such, that it extends crosswise over the open end of the cleaner cone 40. When checking, if the cleaner cone 40 is plugged, a light, advantageously a laser light 42 created by a light source 41, advantageously a laser beam source 41, for example a laser pen is pointed to the emitter end 45A of the optical fiber 45 at the wide end of the cleaner cone 40. The light source 41 is advantageously a mobile device, which is used during a shut-down at an inspection stage to check whether the cleaner cones 20 are plugged or not. The laser light 42 passes from the emitter end 45A to the receiver in the feedback end 45B, if the cleaner cone 40 is not plugged, and the feedback end 45B will glow. If the cleaner cone 40 is plugged, the laser light 42 will not return to the receiver of the feedback end 45B of the optical fiber 45 and the feedback end 45B will not glow.

In the description in the foregoing, although some functions have been described with reference to certain features, those functions may be performable by other features whether described or not. Although features have been described with reference to certain embodiments or examples, those features may also be present in other embodiments or examples whether described or not. Above the invention has been described by referring to some advantageous examples only to which the invention is not to be narrowly limited. Many modifications and alterations are possible within the invention as defined in the following claims.

The invention claimed is:

1. Canister, which canister has a substantially cylindrical form and comprises an innermost compartment located around an imaginary center axis of the cylindrical form and extending longitudinally in axial direction of the canister, which canister comprises cleaner cones, which have a substantially cone-like form with a hollow inside and which cleaner cones are removably mounted to the canister and located in the canister such, that narrow ends of cone form of the cleaner cones extend to the innermost compartment and wide ends of the cone form of the cleaner cones extend to the cylindrical circumference of the canister, in which the cleaner cones comprise covers and the cleaner cones are mounted such that cover of the cleaner cone is outside the canister, which canister further comprises inspection means comprising a light source configured to provide a visible indication of status of a cleaner cone of the canister in view of possible plug in the cleaner cone, when the light source is in operation the light source is configured to illuminate the innermost compartment for detecting a plug in any of the cleaner cones without removing the cleaner cone from the canister by looking whether light in the innermost compartment is visible through the cleaner cone and define the status of the cleaner cone in respect of possible plug in the cleaner cone.

2. Canister according to claim 1, wherein the canister has a cylindrical outer wall and a bottom and a top and the innermost compartment extends longitudinally in axial direction of the canister between the bottom and the top.

3. Canister according to claim 1, wherein the innermost compartment comprises an upper port at the top of the canister.

4. Canister according to claim 1, wherein the light source is a mobile device with a lamp or like light emitting equipment, which is configured to be used during a shut-down at an inspection stage to check whether the cleaner cones of the canister are plugged or not.

5. Canister according to claim 1, wherein the covers of the cleaner cones are transparent and the light in the innermost compartment is visible through the transparent covers of the cleaner cone to define the status of the cleaner cone in respect of possible plug in the cleaner cone.

6. Canister according to claim 1, wherein the covers of the cleaner cones are non-transparent and the cover is configured to be removed from the cleaner cone to check whether the light in the innermost compartment is visible to define the status of the cleaner cone in respect of possible plug in the cleaner cone.

7. Canister according to claim 1, wherein the light source is located in an illuminating part configured to be located in a position of a cleaner cone in the canister.

8. Canister according to claim 1, wherein the light source is located at the upper port of the canister.

9. Canister according to claim 1, wherein the canister also comprises a switch to turn on and off the light source.

* * * * *